United States Patent [19]
Terashima et al.

[11] Patent Number: 5,598,162
[45] Date of Patent: Jan. 28, 1997

[54] REMOVABLE AUDIO REMOTE CONTROLLER FOR A MICROPHONE

[75] Inventors: Junichi Terashima; Jun Maruyama, both of Tokyo, Japan

[73] Assignee: Sega Enterprises, Ltd., Tokyo, Japan

[21] Appl. No.: 529,869

[22] Filed: Sep. 18, 1995

[30] Foreign Application Priority Data

Nov. 14, 1994 [JP] Japan ................................ 6-279514

[51] Int. Cl.⁶ ............................................. G08C 19/12
[52] U.S. Cl. ........................... 341/176; 341/173; 369/49; 181/179
[58] Field of Search .................... 341/173, 176; 369/49; D14/225; 181/179

[56] References Cited

U.S. PATENT DOCUMENTS 5,245,600  9/1993  Yamauchi et al. ................. 369/49

FOREIGN PATENT DOCUMENTS 62-103386  7/1987  Japan .
4-38197    3/1992  Japan .
4-59694    5/1992  Japan .

Primary Examiner—Jeffery Hofsass
Assistant Examiner—Albert K. Wong
Attorney, Agent, or Firm—Price, Gess & Ubell

[57] ABSTRACT

A holder is provided for a remote controller of a karaoke machine. The holder causes the remote controller to be removably held to a handle of a microphone. The holder comprises a portion of an elastic material, such that the portion can tightly fit an outer surface of the handle of the microphone. Further, the holder comprises an approximately C-shaped portion or an approximately ring-shaped portion which matches an outer shape of the handle of the microphone. The remote controller comprises infrared-ray-emitting diodes for emitting a signal in response to a user operating the control buttons to the karaoke machine. A signal-receiving means receives the signal emitted by the signal-emitting means, the signal-receiving means then outputting a relevant signal to the karaoke machine for amplifying a voice input through the microphone, adding accompaniment to the thus-amplified voice and outputting a resulting sound.

27 Claims, 11 Drawing Sheets

FIG. 13
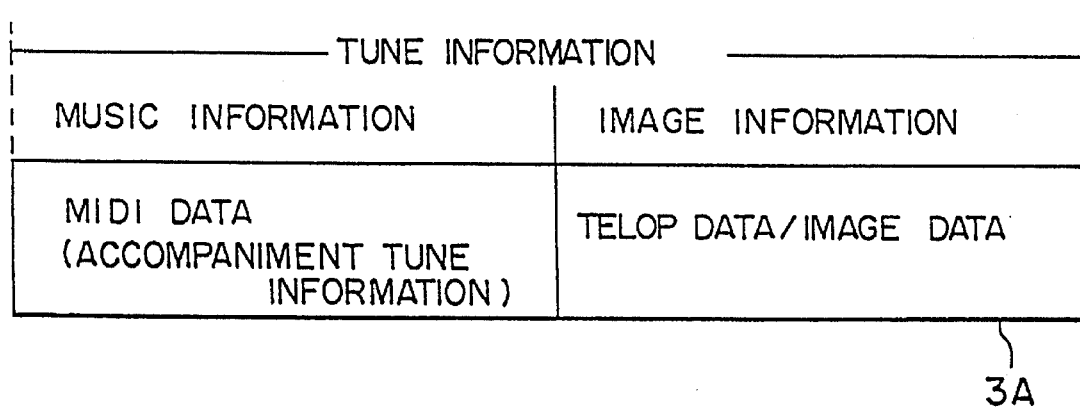
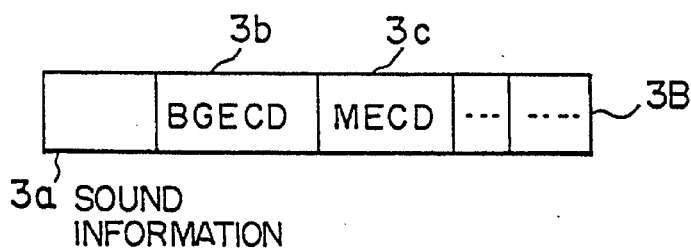

REMOVABLE AUDIO REMOTE CONTROLLER FOR A MICROPHONE

BACKGROUND OF THE INVENTION

1. Field of the Invention

The present invention relates to a remote optical/electrical controller that can be used in a so-called karaoke sing-along machine, which will be hereinafter referred to as simply a karaoke machine. The karaoke machine is an audio machine which supplies an accompaniment, such as a musical orchestra accompaniment, and a user may then sing along with the thus-supplied accompaniment. Through use of the remote controller, the user may remotely operate the karaoke machine and thus may change states of the currently supplied accompaniment. The karaoke machine can also be provided with a voice amplifying device for amplifying a user's singing voice which is input through a microphone.

2. Description of Related Art

A karaoke machine is provided with a variety of operation buttons which can be used for changing a musical interval of the accompaniment, for adding audio echo effects to a user's singing voice input through the microphone, and so forth. The user may thus enjoy singing while freely controlling the musical interval of the accompaniment and/or adding special echo effects to the user's singing voice by appropriately manipulating the operation buttons.

Ordinarily, these operation buttons are provided on a main body of the karaoke machine. However, there is a karaoke machine having operation buttons on its microphone which is separately provided with the karaoke machine. FIG. 1 shows such a microphone. As shown in the figure, a microphone body 10 is provided with musical interval control buttons 11 and 12 thereon. This microphone body 10 is connected to a karaoke machine body through an electric cable 14 and pin plugs 15 and 16. The pin plug 15 is used for carrying a voice signal and the pin plug 16 is used for carrying a musical interval control signal.

FIG. 2A shows a connection between the microphone body 10 and the cable 14, and the connector 17 is directly connected to the microphone body 10. As shown in the figure, the connector 17 has five pin plugs projecting therefrom acting as a male electric terminal and the microphone body 10 has relevant five holes acting as a female electric terminal. The five pin plugs are inserted into the five holes and thus proper electrical connection is performed between the microphone body 10 and cable 14.

FIG. 2B shows a connection between a microphone body 20 and a cable 21 in a case in which the microphone body is not provided with control buttons, such as the musical interval control buttons 11 and 12, shown in FIG. 1. Because the microphone body 10 is not provided with such control buttons, the number of pin plugs acting as a male electric terminal provided to a connector 22 can be reduced to three. Similar to this, a number of holes acting as a female electric terminal may also be reduced to three.

In addition to the above-described matters, the cable 21, shown in FIG. 2B, is a cable ordinarily used with a microphone for general use. However, the cable 14, shown in FIG. 2A, must be a special cable, such that the cable 14 can carry the musical interval controlled by the musical interval control buttons 11 and 12.

As described above, the microphone shown in FIG. 1, provided with a musical interval control function, has a special cable 14 and special connector 17. As a result, the microphone, shown in FIG. 1, can only be used for special karaoke machines. Thus, an application range of such a microphone is relatively narrow.

There is still a need in the related art to provide an improved remote controller for the user of a remote audio system.

OBJECTS AND SUMMARY OF THE INVENTION

An object of the present invention is to provide a remote controller which may be used for karaoke machines of various types, which does not require a special cable or a special connector when a microphone is connected to a karaoke machine body, and which thus has a wide application range.

A remote controller according to the present invention comprises a removable holder for enabling control buttons and signal-emitting means to be held to a handle of a microphone. By this holder, the remote controller may be held to a handle of ordinary microphones of various types. Therefore, the remote controller according to the present invention may be applied to karaoke machines of various types with minimal modifications.

Further, the holder of the remote controller comprises a portion of an elastic material, such that the portion can tightly fit an outer surface of the handle of the microphone. Further, the holder comprises an approximately C-shaped portion or an approximately ring-shaped portion which matches an outer shape of the handle of the microphone. Using this holder, the remote controller may be easily and surely held to the handle of the microphone.

Further, the remote controller includes a signal-emitting means of an infrared-ray-emitting diode. Therefore, an optical signal, emitted in response to the user operating a control button, is easily and surely transmitted to a karaoke machine.

The signal-emitting means can comprise a plurality of infrared-ray-emitting diodes. Therefore, the user may hold the microphone together with the remote controller in any position and may freely control the karaoke machine through the remote controller while enjoying singing by the use of the karaoke machine. Thus, the remote controller has an improved operational performance.

A remote control system according to the present invention comprises signal-receiving means for receiving the signal emitted by the signal-emitting means, the signal-receiving means outputting a relevant signal to a karaoke machine for amplifying a voice input through the microphone, adding accompaniment to the thus-amplified voice and outputting a resulting sound.

By this signal-receiving means, the remote controller can be applied to a karaoke machine which has a pin jack, into which the pin plug 16, shown in FIG. 1, may be inserted. The pin jack is used for receiving a signal for remotely controlling the karaoke machine from the microphone 10, shown in FIG. 1. The signal receiving means is provided with a pin plug the same as the pin plug 16. The signal-receiving means supplies a signal relevant to the signal received from the signal-emitting means to the karaoke machine via the connection between the pin plug provided to the signal-receiving means and the pin jack provided to the karaoke machine. Thus, it is possible to widen an application range of the remote controller.

Other objects and further features of the present invention will become more apparent from the following detailed description when read in conjunction with the accompanying drawings.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 13 is a schematic of packets of information; and

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide an improved removable audio remote controller for a microphone.

Figure 3A:
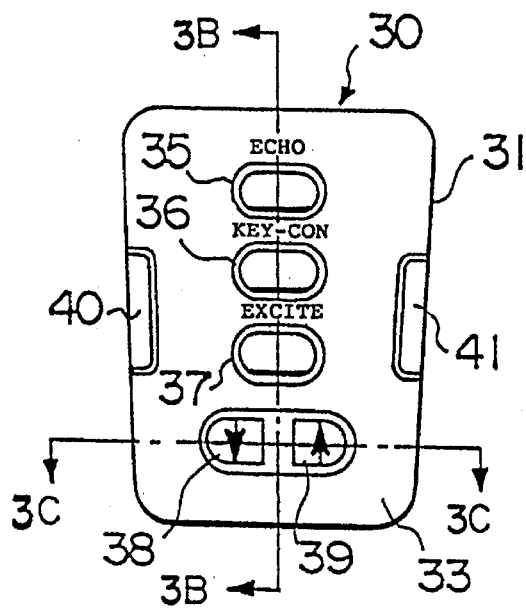
FIG. 3A shows a plan view of a remote controller in an embodiment of the present invention.
Figure 3B:
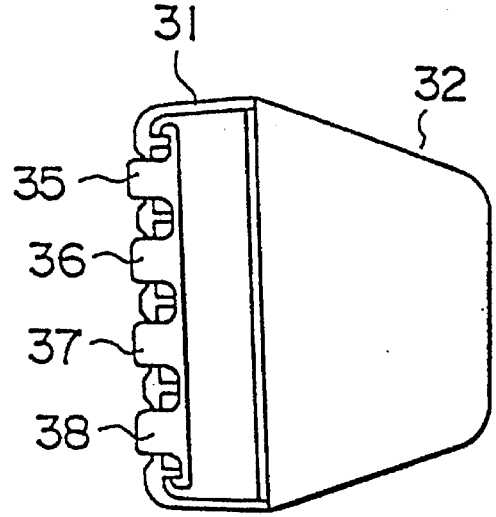
FIG. 3B shows a longitudinal sectional view, viewed along a line B-B' of FIG. 3A, of the remote controller shown in FIG. 3A.
Figure 3C:
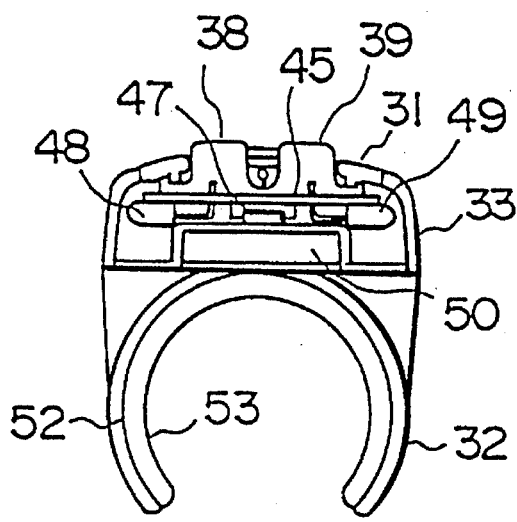
FIG. 3C shows a cross-sectional view, viewed along a line C-C' of FIG. 3A, of the remote controller shown in FIG. 3A.

With reference to FIGS. 3A, 3B, and 3C, a remote controller in a first embodiment of the present invention will now be described. The remote controller 30, as shown, is used for a karaoke machine and includes a body 31 and a holder 32. As can be appreciated, the remote controller with modifications can be used in other audio devices where the user wishes to modify certain audio features, while holding a microphone.

A front and two sides of the body 31 are enclosed by a plastic resin-made case 33, a front surface of which is, as shown in the figures, provided with a silicon-rubber-made echo button 34, a key-con button 36, an excite button 37, a down button 38, and an up button 39. Further, side surfaces of the case 33 are provided with optical filters 40 and 41.

The echo button 35 is used for switching on and switching off a control of echo effects. After the control of echo effects is switched on through the button 36 as a result of being operated by a user, the echo effects are enhanced when the up button 39 is pressed by the user and are diminished when the down button 38 is pressed by the user. The echo effects are added to a singing voice of the user through the karaoke machine as a result of appropriately controlling an amplifier for amplifying the singing voice which is input through a microphone.

The key-con button 38 is used for switching on and switching off the control of musical intervals. After the control of musical intervals is switched on through the button 36 as a result of being operated by the user, the music intervals are raised when the up button 39 is pressed by the user and are lowered when the down button 38 is pressed by the user. The music intervals are those of an accompaniment, such as an orchestra accompaniment as supplied by the karaoke machine.

The excite button 37 is used for switching on and switching off a control of special excite effects. The excite effects can be effects obtained as a result of harmonics being added to the singing voice input through the microphone in the karaoke machine. After the control of excite effects is switched on through the button 37 as a result of being operated by the user, the excite effects are enhanced when the up button 39 is pressed by the user and are diminished when the down button 38 is pressed by the user.

The filters 40 and 41 are provided for passing infrared rays therethrough and also for protecting the inside of the case 33, and particularly protecting infrared-ray-emitting diodes 48 and 49.

As shown in FIG. 3C, a circuit substrate 45 is appropriately fixed in the inside of the case 33. Electric switches can also be provided on the circuit substrate 45, each switch including a pair of electrical contacts which come into contact with each other when a respective button of the above-mentioned buttons is appropriately pressed by the user.

An integrated circuit 47 and infrared-ray-emitting diodes 48 and 49 are provided in the inside of the case 33. Further, a battery 50, acting as a power source for the integrated circuit 47 and the infrared-ray-emitting diodes 48 and 49, is provided in the inside of the case 33. The holder 32 is attached to the case 33 and has a cross-sectional shape of a letter C, as shown in FIG. 3C, and is fixed to the body 31 or integrally molded together with the case 33. The holder 32 has a configuration to be removably secured to an exterior portion of a microphone. The holder 32 can be made of a resin-made enclosure 52 and a rubber 53 of elastic material adhering to the inside of the enclosure 52.

Figure 4A:
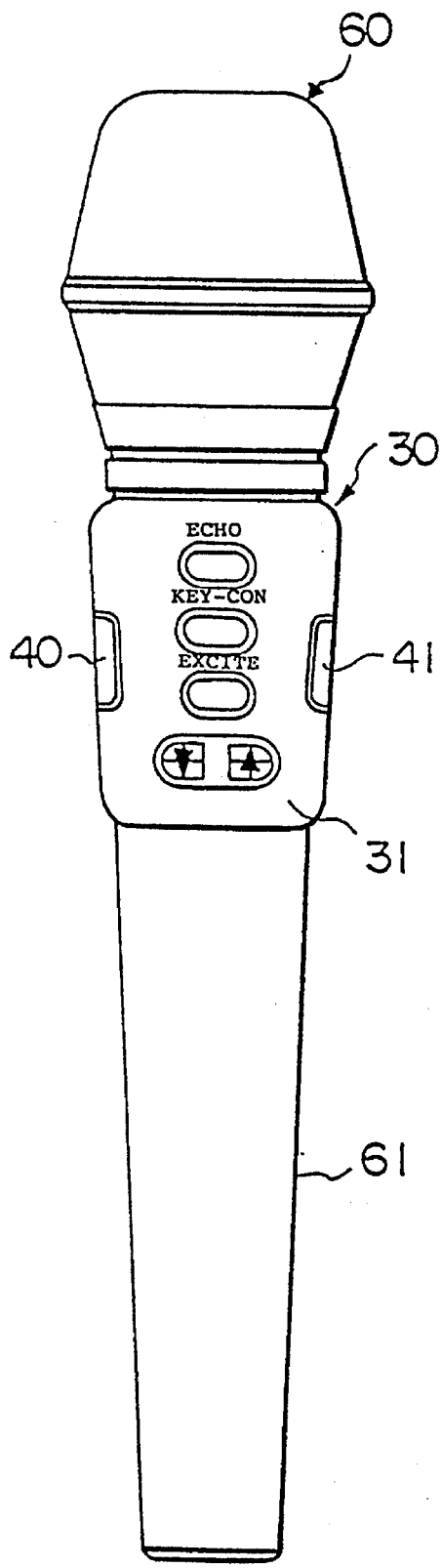
FIGS. 4A and 4B show the remote controller shown in FIGS. 3A, 3B, and 3C in a state in which it is held to a handle of a microphone.
Figure 4B:
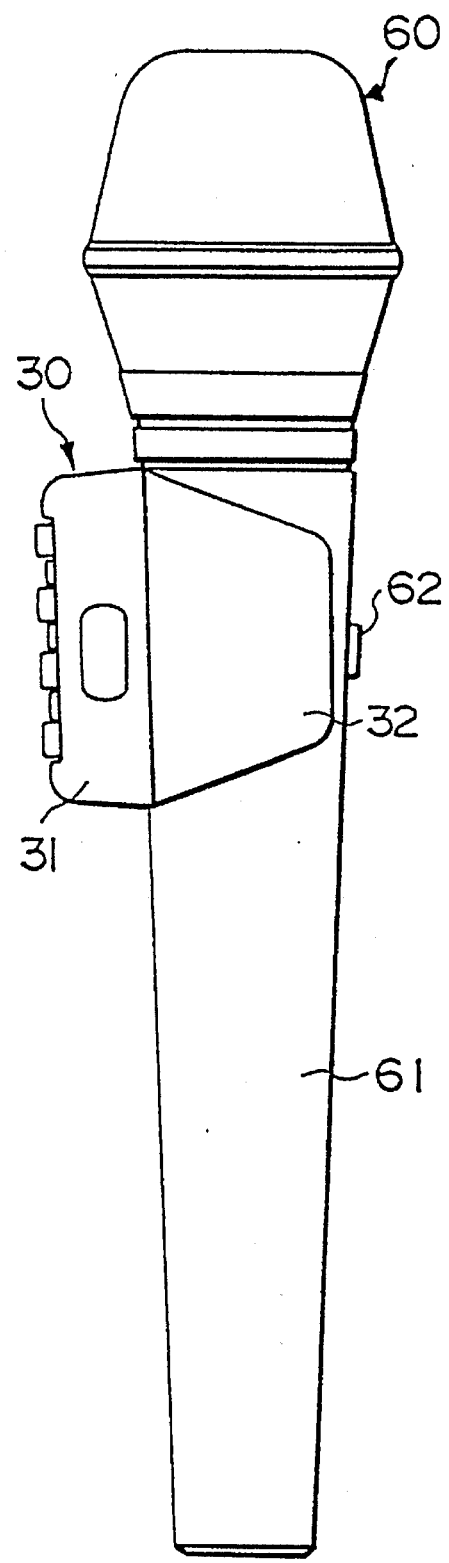

As shown in FIGS. 4A and 4B, this remote controller 30 is held to a handle 61 of a microphone body 60 through the holder 32. The handle 61 of the microphone body 60 has an approximately cylindrical shape. In the state shown in the figures, the handle 61 of the microphone body 60 is inserted into the holder 32 of the remote controller 30. The above-mentioned enclosure 52 of the holder 32 presses the handle 61 of the microphone body 60 via the rubber 53. Thus, the rubber 53 of the elastic material is elastically deformed so as to fit an outer shape of the handle 61. As a result, the remote controller 30 is tightly held in the handle 61 of the microphone body 60 through a frictional fit.

The microphone body 60 has a power switch 62 provided on the handle 61, as shown in FIG. 4B. The position at which the holder 32 of the remote controller 30 is held to the microphone handle 61 is such that the holder 32 does not come into contact with the power switch 52.

Figure 5:
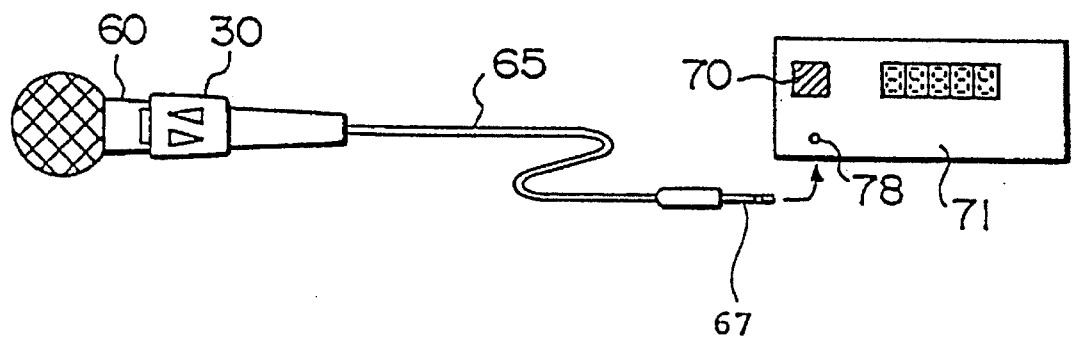
FIGS. 5 and 6 show applications of the remote controller shown in FIGS. 3A, 3B, and 3C to karaoke machines.

As shown in FIG. 5, the remote controller 30 may be used as a part of the karaoke machine 71 which has an infrared ray receiver 70 therein. The infrared ray receiver 70 has a function of receiving infrared rays emitted by the above-mentioned infrared-ray-emitting diodes 48 and 49 of the remote controller 30. Thus, signals transmitted by the remote controller 30 are properly input to the karaoke machine 71 through infrared ray communication.

Figure 1:
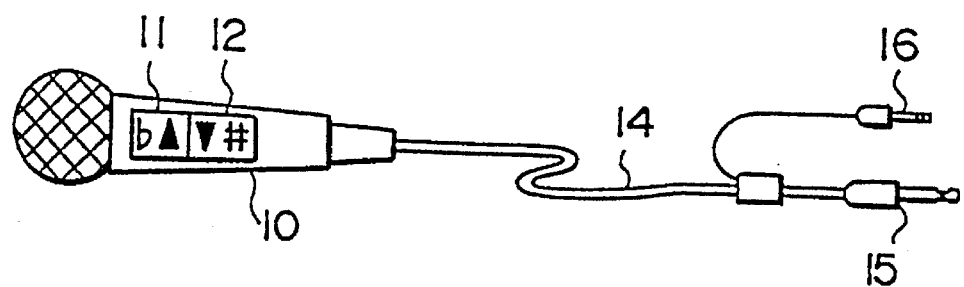
FIG. 1 shows a microphone in the related art.
Figure 6:
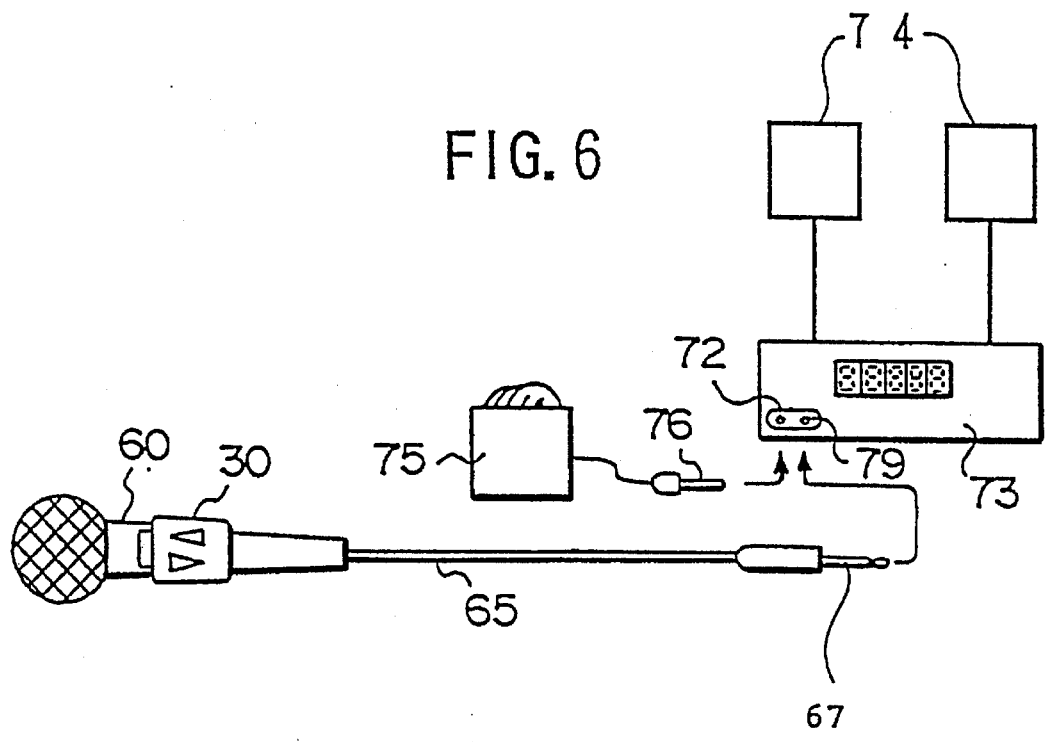

Further, as shown in FIG. 6, it is also possible to use the remote controller 30 as a part of a karaoke machine 73, which has a pin jack 72. The pin jack 72 is provided to be originally used for the above-mentioned pin plug 16 of the cable 14, as shown in FIG. 1 to be inserted therein. In this case, as shown in the figure, an infrared ray receiver 75 is separately provided for receiving infrared rays emitted by the infrared-ray-emitting diodes 48 and 49 of the remote controller 30. This infrared ray receiver 75 has a pin plug 76 to be inserted into the above-mentioned pin jack 72 of the karaoke machine 73. Thus IR signals transmitted by the remote controller 30 are received by receiver 75, converted to electrical signals, and properly input to the karaoke machine 73 through infrared ray communication.

Figure 2A:
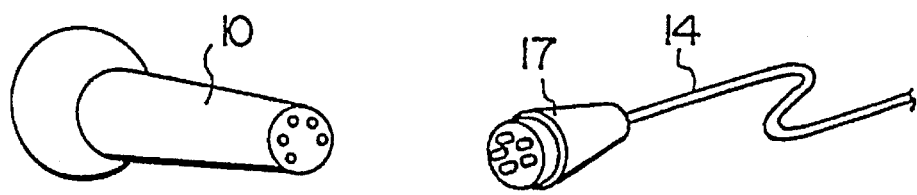
FIGS. 2A and 2B show microphone bodies, cables, and connectors in the related art.
Figure 2B:
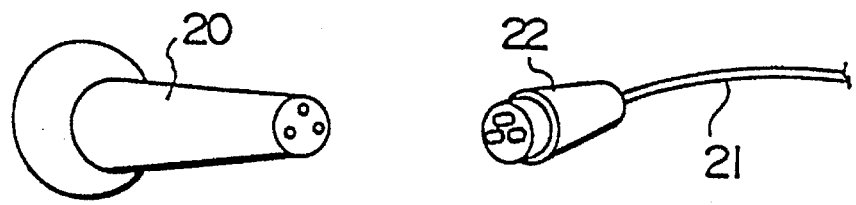

The microphone body 60 to which the remote controller 30 is held, as shown in FIGS. 5 and 6, is an ordinary microphone, such as the microphone shown in FIG. 2B. An electric cable 65, connected to the microphone body 60, has an electric connector fixed to one end thereof, having three pin plugs projecting therefrom (not shown in the figures). This connector is directly connected to the microphone body 60. The cable 65 also has an electric connector having a pin plug 67 projecting therefrom, and this pin plug 67 is inserted into a pin jack 78 of the karaoke machine 71 or a pin jack 79 of the karaoke machine 73. Thus, a voice signal transmitted by the microphone body 60 is properly input to the karaoke machine 71 or 73 through the electric cable 65 and can be amplified and broadcast by an audio speaker of speakers.

Figure 7:
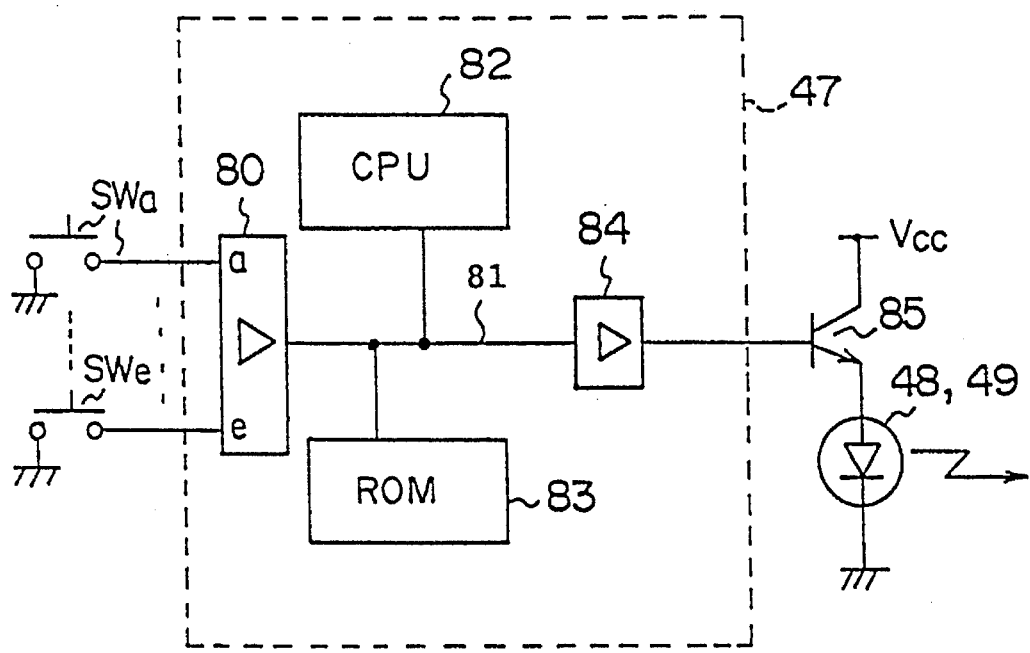
FIG. 7 shows a circuit diagram of an electric circuit provided inside the remote controller shown in FIGS. 3A, 3B, and 3C.
Figure 8:
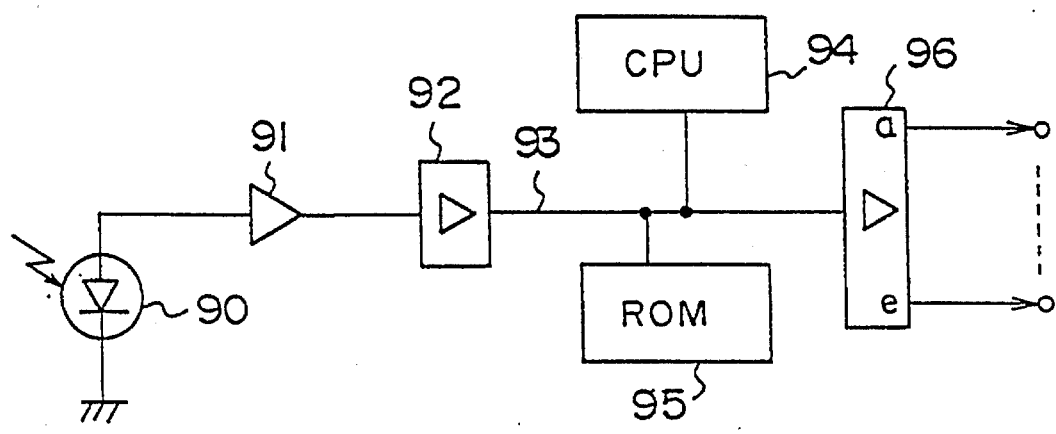
FIG. 8 shows a circuit diagram of an electric circuit provided inside an infrared ray receiver shown in FIG. 6.

With reference to FIGS. 7 and 8, an inner circuit structure of the remote controller 30 and an inner circuit structure of the above-mentioned infrared ray receiver 75, shown in FIG. 6, will now be described. As shown in FIG. 7, the electric switches SWa through SWe are provided on the circuit substrate 45, each switch including a pair of electrical contacts which come into contact with each other when a respective button of the above-mentioned buttons 35 through 39 is appropriately pressed by the user, as mentioned above. One of the pair of electrical contacts is grounded and the other one thereof is connected to a respective one of electric terminals a through e of an input/output interface circuit (I/O) 80 provided in the integrated circuit 47.

A bus 81 is used to transfer an electric signal between the input/output interface circuit 80, a CPU 82, a ROM 83, and another input/output interface circuit 84, as shown in FIG. 7. The input/output interface circuit 84 is connected to the infrared-ray-emitting diodes 48 and 49 via a power transistor 85.

The CPU 82 monitors voltage states of the input/output interface circuit 80 at predetermined time intervals. Thus, if, for example, the pair of contacts of the switch SWa come into contact with each other as a result of the button 35 being pressed by the user, this coming into contact is detected by the CPU 82 through the input/output interface circuit 80. Then, the CPU 82 reads out a code relevant to this state from the ROM 83 and causes the infrared-ray-emitting diodes 48 and 49 to emit infrared rays in accordance with a signal pattern relevant to the thus-read-out code.

In the inner circuit of the infrared receiver 75, shown in FIG. 8, an infrared receiving diode 90 receives the infrared rays, thus omitted by the infrared-ray-emitting diodes 47 and 49. The infrared receiving diode 90 then converts the thus-received infrared rays to an electric signal. The thus-obtained electric signal is amplified by an amplifier 91 and supplied to an input/output interface circuit 92. A bus 93 is used to transfer an electric signal between the input/output interface circuit 92, a CPU 94, a ROM 95, and another input/output interface circuit 96, as shown in FIG. 8. The input/output interface circuit 96 has output terminals a through e. The CPU 94 reads a signal pattern of the electric signal input to the input/output interface circuit 82 and compares the signal pattern with a plurality of codes previously stored in the ROM 95. Thus, the CPU 94 determines which one of the plurality of codes corresponds to the signal pattern and thus identifies the signal pattern as resulting from, in the above-mentioned example, the pair of contacts of the switch SWa coming into contact with each other.

Then, the CPU 94 outputs a signal to indicate that the pair of contacts of the switch SWa have come into contact with each other through the input/output interface circuit 96. The above-mentioned terminals a through e of the circuit 96 are connected to the karaoke machine 73 via the pin plug 76 and pin jack 72, shown in FIG. 6. Thus, operations where the user presses buttons 35 through 39 are appropriately transferred from the remote controller 30 to the karaoke machine 73. As a result, the karaoke machine 73 responds thereto so as to enhance/diminish the echo effects, raise/lower the musical intervals, and enhance/diminish the harmonics as described in the description of each button of the remote controller 30.

The karaoke machine 71, shown in FIG. 5, has a circuit the same as the circuit shown in FIG. 8 therein. Thus, through this circuit, in the same manner as in the above-described operation procedure, the operations that the user presses buttons 35 through 39 are appropriately transferred from the remote controller 30 to the karaoke machine 71. As a result, the karaoke machine 71 responds thereto so as to enhance/diminish the echo effects, raise/lower the musical intervals, and enhance/diminish the harmonics as described in the description of each button of the remote controller 30.

Thus, the remote controller 30 is used in a state in which it is removably held to the handle of the microphone 60 through the holder 33. Therefore, an ordinary microphone, which does not have a special cable, such as the cable 14 shown in FIG. 1 for carrying button pressing signals, can be easily used as a microphone having a remote controller. Further, the remote controller 30 may be applied to microphones of various types and may be applied to karaoke machines of various types, as shown in FIGS. 5 and 6. Therefore, the remote controller 30 has a wide range of applications.

Because the remote controller 30 transmits the signals through infrared rays, the signals are not likely to be adversely affected by electromagnetic noises. Further, the remote controller 30 can have two infrared-ray-emitting diodes 48 and 49, that is, a plurality of infrared-ray-emitting diodes, and the diodes can emit infrared rays through the filters 40 and 41. The infrared-ray-emitting diodes 48 and 49 are provided, as shown in FIG. 3C, at opposite sides of the body 30. Therefore, the infrared-ray-emitting diodes 48 and 49 emit infrared rays in a wide angle range. As a result, it is not necessary to be concerned about the direction in which the infrared rays are emitted from the remote controller 30 relative to the location of the infrared receiver of the karaoke machine. Therefore, the user may hold the microphone 60 together with the remote controller 30 in any position and may freely control the karaoke machine through the remote controller 30, while enjoying singing, using the karaoke machine. Thus, the remote controller 30 has an improved operational performance.

The infrared rays emitted by the remote controller 30 are emitted in accordance with the codes previously stored in the ROM 83, as mentioned above. Each code of these codes includes a manufacturer code, a type code, and a button code. If a manufacturer of the karaoke machine 71 or 73 is different, the above-mentioned manufacturer code is to be different accordingly. In order to change the manufacturer code and type code in response to a case where a manufacturer and/or a type of the karaoke machine is changed, a DIP switch may be provided in the remote controller 30. As a result, the remote controller 30 may be universally applied to karaoke machines manufactured by any manufacturer.

Further, control buttons provided on the remote controller 30 are not limited to those 35 through 39, shown in FIG. 3A. It is also possible to provide control buttons, shown in FIG. 9A, or control buttons, shown in FIG. 9B, instead of those 35 through 39.

Figure 9A:
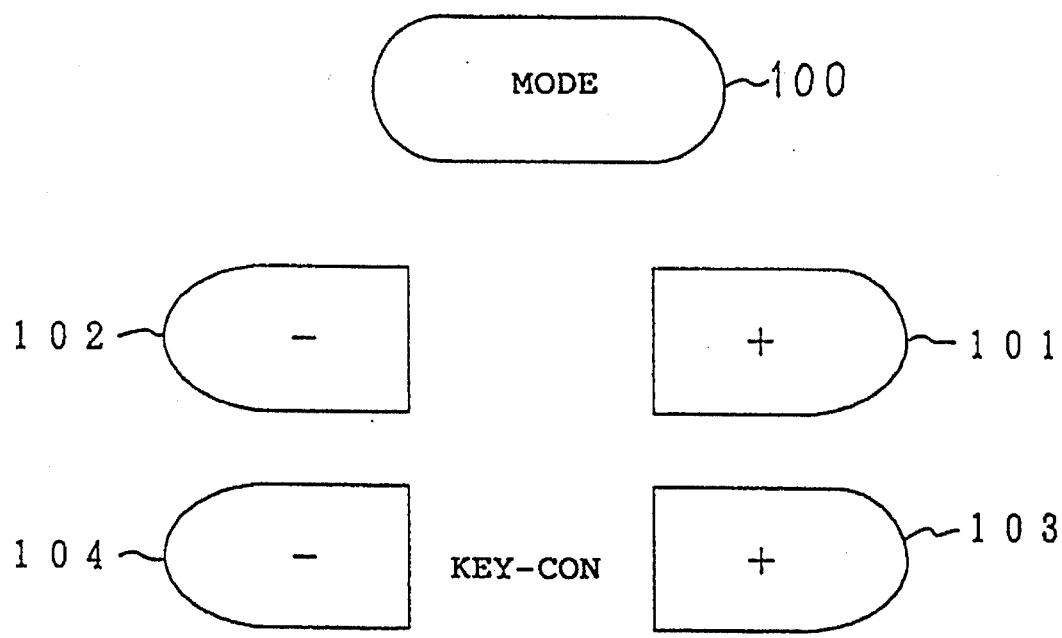
FIGS. 9A and 9B show other embodiments of control buttons of the remote controller in the present invention.

The control buttons, shown in FIG. 9A, are an effect mode switching button 100, an effect-amount up button 101, and effect-amount down button 102, a key-con up button 103, and a key-con down button 104. The effect-mode switching button 100 is used to select one of an echo mode, a chorus mode, an excite mode, and so forth. If the echo mode is selected, an original voice input through the microphone is delayed and is added with the thus-delayed voice. Thus, echo effects can be obtained. If the chorus mode is selected, an original voice input through the microphone is added with a one octave higher or one octave lower voice thereof. Thus, the user can enjoy producing a chorus by him /herself. If the excite mode is selected, an original voice input through the microphone is added with harmonics thereof and thus a tone quality of the voice is changed.

The above-mentioned effect-amount up button 101 and effect-amount down button 102 are used for increasing and decreasing an amount in which a respective one of the delayed voice, octave higher/lower voice, and harmonics is added to the-original voice. The key-con up button 103 and key-con down button 104 are used for raising and lowering a musical interval of the accompaniment.

Figure 9B:
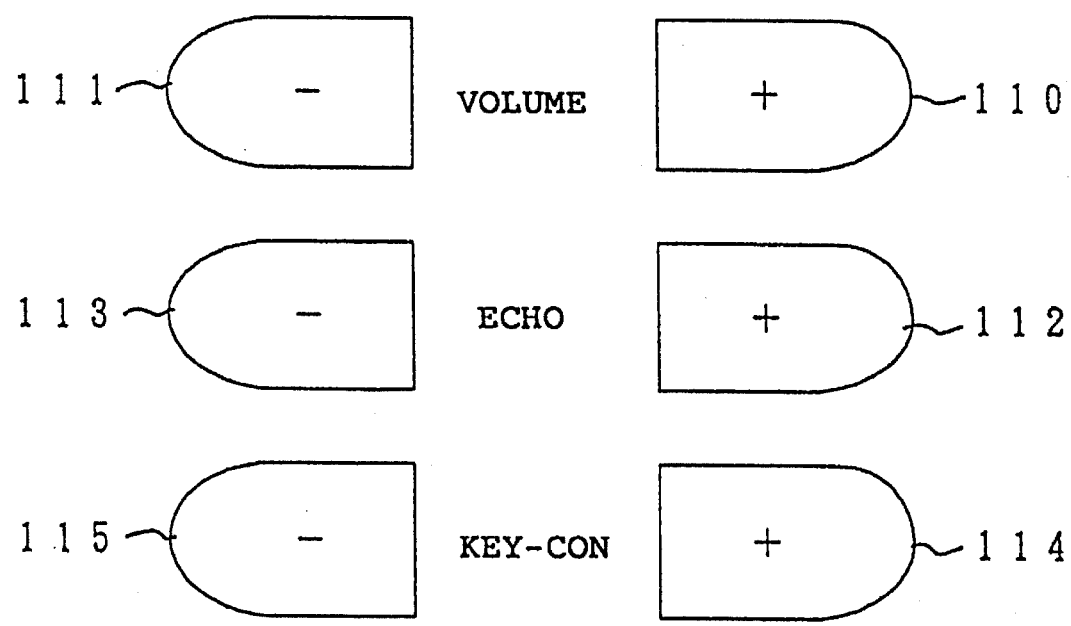

The control buttons, shown in FIG. 9B, are a microphone volume up button 110, a microphone volume down button 111, and echo-amount up button 112, and echo-amount down button 112, a key-con up button 114, and a key-con down button 115. The microphone-volume up button 110 and microphone-volume down button 111 are used for increasing and decreasing the volume of an amplified voice of a voice input through the microphone. The echo-amount up button 112 and echo-amount down button 113 are used for enhancing and diminishing the echo effects. The key-con up button 114 and key-con down button 115 are used for raising and lowering a musical int4erval of the accompaniment.

Figure 10:
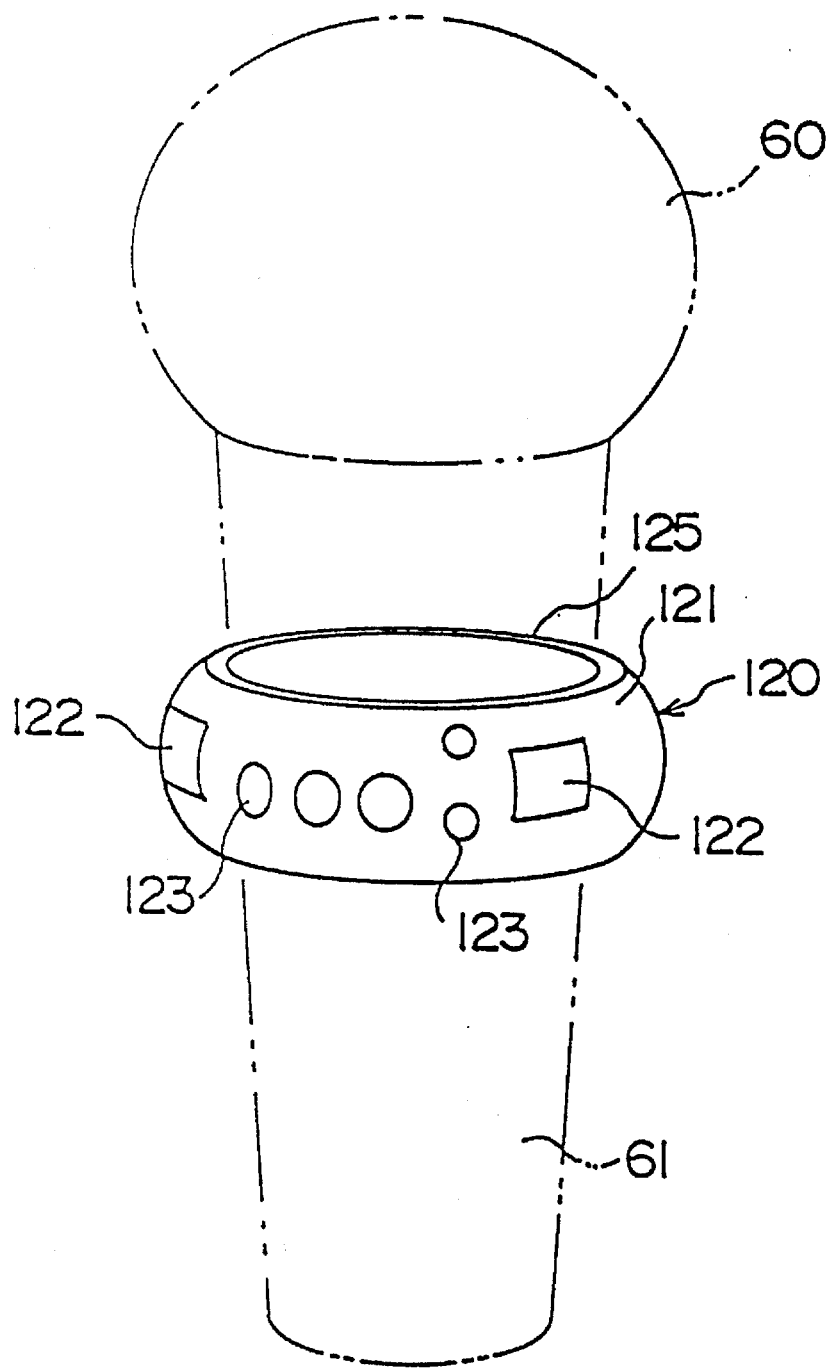
FIG. 10 shows a perspective view of a remote controller in a variant of the embodiment of the present invention shown in FIGS. 3A, 3B, and 3C.

The shape of the remote controller in the present invention is not limited to that shown in FIGS. 3A, 3B, and 3C. It is also possible to provide an alternative remote controller 120, shown in FIG. 10. The remote controller 120 has an approximately ring-like shape and a body of the remote controller 120 is also a holder for causing the remote controller 120 to be held to the handle 61 of the microphone 60 therethrough. At least three filters 122, equally spaced about the circumference, are capable of simultaneously emitting infrared rays therethrough and are provided on a periphery of a resin made case 121. Further, control buttons 123, such as an echo button, a key-con button, an excite button and so forth, are also provided on the periphery of the case 121. A rubber 126 of elastic material adheres to an inner surface of the case 121.

The remote controller 120 is held to the handle 61 of the microphone 60 as a result of the handle 61 being inserted into a hole formed in the ring-shaped case 121 of the remote controller 120. The case 121 presses the handle 61 of the microphone body 60 via the rubber 125. Thus, the rubber 125 of the elastic material is elastically deformed so as to fit an outer shape of the handle 61. As a result, the remote controller 120 is tightly held to the handle 61 of the microphone body 60.

Figure 11:
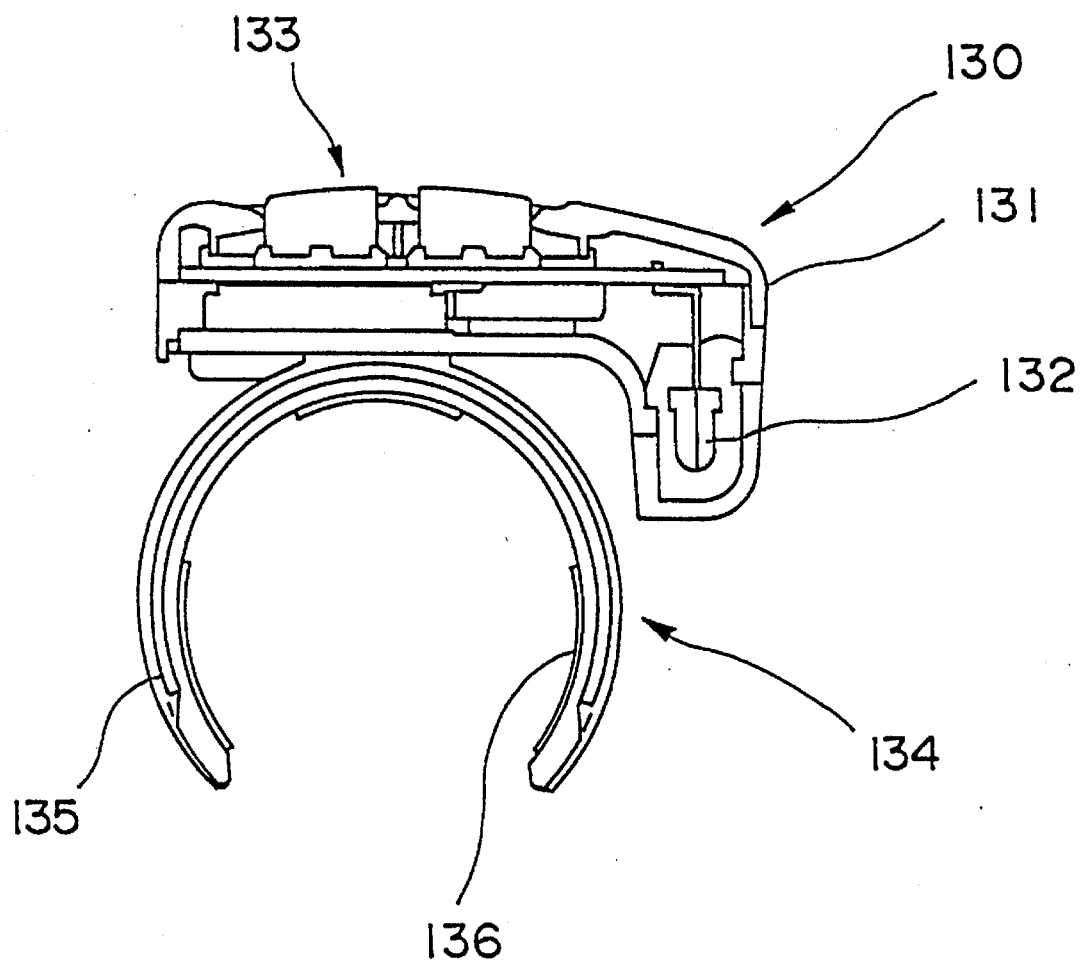
FIG. 11 shows a cross-sectional view of another embodiment of a remote controller.

FIG. 11 discloses an alternative embodiment of a remote controller adapter 130 having a housing or case 131 of substantially a cross-sectional L-configuration with an infra-red emitter 132 positioned in the lower leg section of the L-shaped housing 131 to emit a wide field angle of infrared energy. As with the other controller embodiments, appropriate operation control buttons 133 are mounted on the upper surface of the housing 131.

A C-shaped holder 134 is suspended from the bottom of the housing 131 and has a configuration to be remotely secured to an exterior portion of a microphone handle. The C-shaped holder can include a resilient stainless steel spring member 135 having an interior covering of a rubber 136 to provide a compressive fit with the microphone handle.

Figure 12:
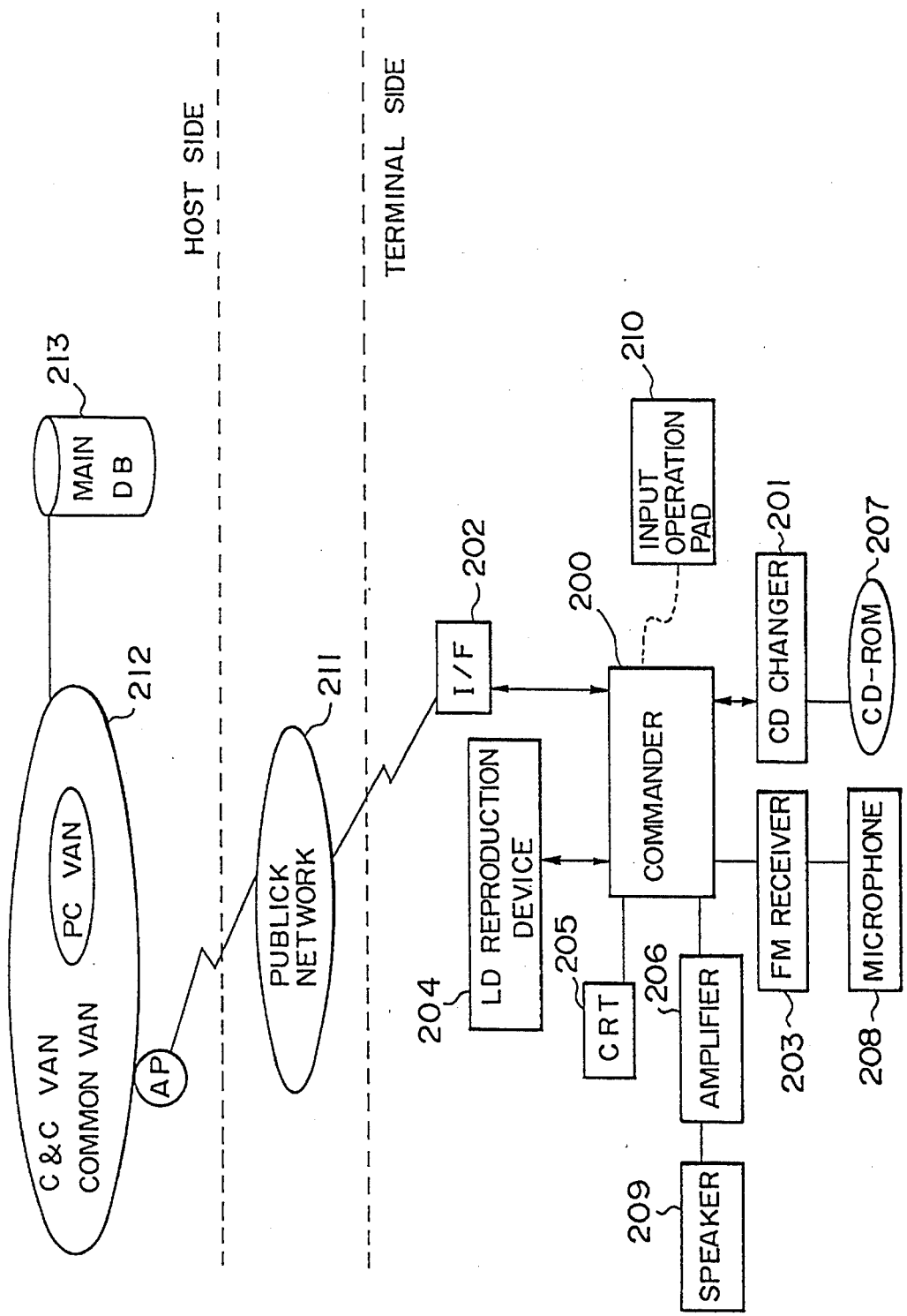
FIG. 12 is a schematic drawing of a remote host and multiple server Karaoke network system.

An example of a communications Karaoke apparatus that can be used with the present invention is describe in FIG. 12.

FIG. 12 is a general block diagram of a communications Karaoke apparatus. As shown in the figure, in the apparatus, a Value Added Network, VAN 212 is accessed via a public communications network 211. Thus, desired tune information is obtained from a vast amount of tune information stored in a main data base 213 of a large-scale computer on the host or supplier side.

A commander 200 which is a Karaoke reproduction device on a terminal side is connected to a CD changer 201 provided with an automatic changing function for driving a CD-ROM 207, an interface I/F 202 for connecting with the public communications network 211, an AM receiver for receiving a voice signal input through a microphone 208, an LD reproduction device 204 for outputting a relevant video image during a play of a Karaoke tune, a CRT 205 for outputting telops (the words of a relevant song) and a video image associated with the song, and an amplifier 206 for amplifying music information and a voice of a singer and then sending amplified information to a speaker 209. The commander 200 is remotely controlled by an input operation pad 210.

In the CD-ROM 207, Karaoke tune information is stored after being compressed in an MPEG method. As shown in FIG. 13, the tune information 3A can include music information and image information. The music information is mainly for an accompaniment part of a relevant tune, and is converted into a digital signal (will be referred to as "MIDI data", hereinafter) in accordance with the MIDI standard.

In FIG. 13, in each data block 3B of MIDI data, sound information 3a for each sound which constitutes a relevant accompaniment part, and, if necessary, accompaniment effect control data BGFECD 3b are included as predetermine sector information. Further, if necessary, microphone effect control data MECD 3c for specifying a type of effect to be added to a voice input through the microphone 208 according to relevant sound information 3a is included as predetermined sector information.

Further, in the image information of the tune information, character data (telop data, hereinafter) for the words of a song of a relevant tune and image data for a ideo image associated with the song is included.

Figure 14:
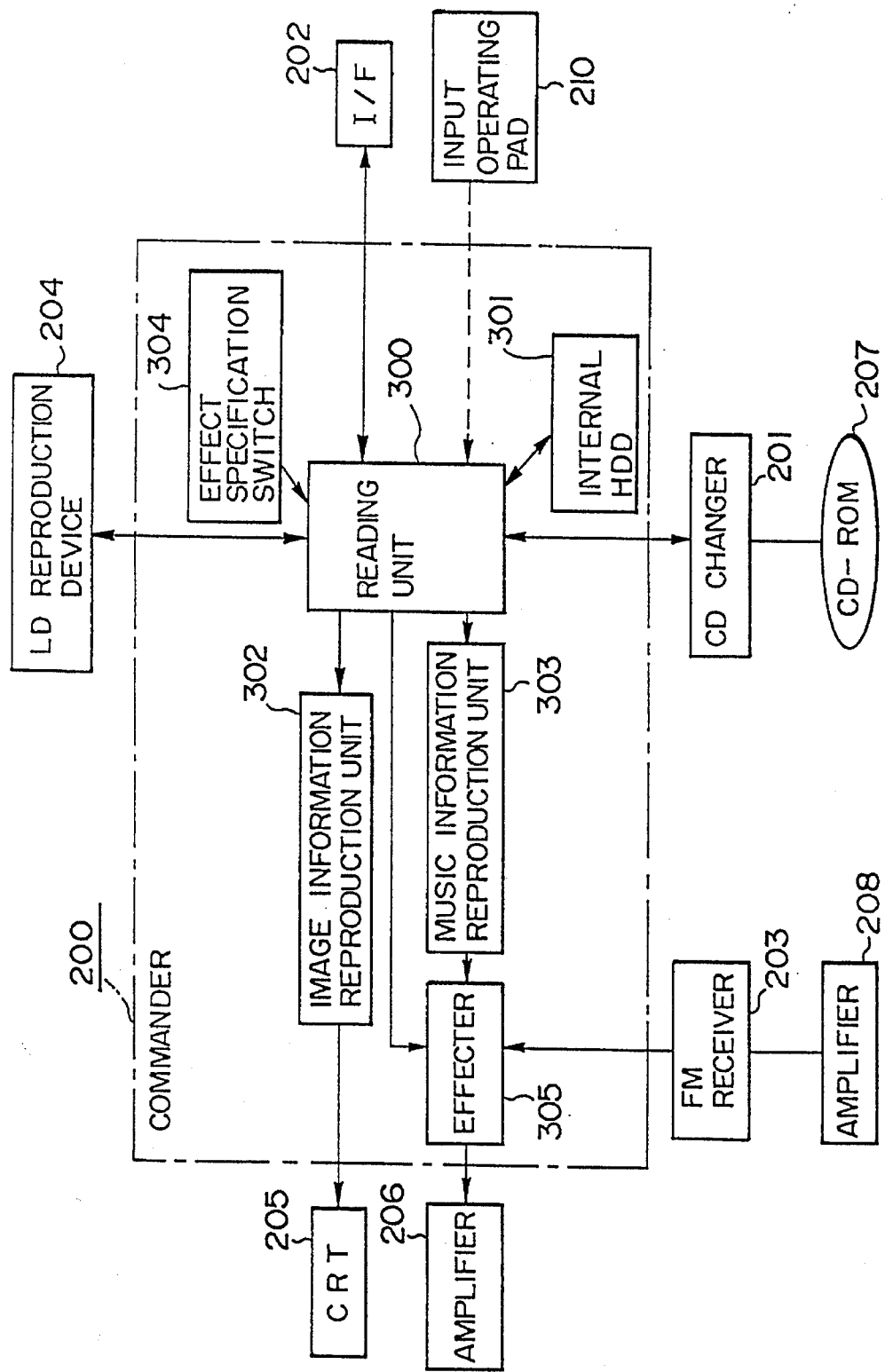
FIG. 14 is an expanded schematic of the commander module of the Karaoke network.

With reference to FIG. 14, the commander 200 will now be described. The commander 200 includes a reading unit 300 for reading Karaoke tune information and controlling the reproduction of the tune information, an internal hard disk 301 for storing tune information of a newly issued record transmitted from the data base 213 in the host side, an image information reproduction unit 302 for reproducing image information of the read tune information, a music information reproduction unit 303 for reproducing music information of the read tune information, an effect specification switch 304 for setting contents of effect to be added to a voice input from the microphone 208, and an effector 305 for adding predetermined effect to the music information and the voice input from the microphone 208. The remote controller of the present invention can be removably mounted on the microphone 208 and can provide operator control inputs into the commander 200. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A removable audio remote controller for attachment to a hand-held microphone body to enable a user to provide special effects to audio output signals from an audio reproduction system while holding the microphone, comprising:

a remote controller housing configured to be removably mounted on the microphone body;

a holder connected to the remote controller housing and configured to be removably secured to the microphone body;

user means on the remote controller housing for selecting audio effects to be applied to an audio output signal; and signal emitting means, on the remote controller housing, for communicating the selected audio effects to the audio reproduction system.

2. The removable audio remote controller for a microphone according to claim 1, wherein said holder comprises a portion of elastic material, such that said portion can be tightly fitted upon a handle of said microphone.

3. The removable audio remote controller for a microphone according to claim 1, wherein said holder comprises an approximately C-shaped portion which matches an outer shape of a handle of said microphone.

4. The removable audio remote controller for a microphone according to claim 1, wherein said holder comprises an approximately ring-shaped portion which matches an outer shape of a handle of said microphone.

5. The removable audio remote controller for a microphone according to claim 1, wherein said signal-emitting means comprises an infrared-ray-emitting diode.

6. The removable audio remote controller for a microphone according to claim 1, wherein said signal-emitting means comprises a plurality of infrared-ray-emitting diodes.

7. A removable audio remote controller for a microphone as recited in claim 1 wherein said user means includes an echo-effect control means for controlling an amount of a delayed voice to be added to a voice input through said microphone.

8. A removable audio remote controller for a microphone as recited in claim 1 wherein said user means includes an excite-effect control means for controlling an amount of harmonics to be added to a voice input through said microphone.

9. A removable audio remote controller for a microphone as recited in claim 1 wherein said user means includes a chorus-effect control means for controlling an amount of one octave different voice to be added to a voice input through said microphone.

10. A removable audio remote controller for a microphone as recited in claim 1 wherein said user means includes a volume control means for controlling a volume of an amplified voice of a voice input through said microphone.

11. A remote control system for use with a hand-held microphone comprising:

a removable audio remote controller for attachment to a microphone comprising at least one operating member for a user to operate, signal-emitting means for emitting a signal in response to said user operating said at least one operating member and a holder configured to be removably mounted to said microphone for causing said at least one operating member and said signal-emitting means to be held to a handle of said microphone; and signal-receiving means for receiving said signal emitted by said signal-emitting means, said signal emitting means outputting a relevant signal to a karaoke machine for amplifying a voice input through said microphone, adding accompaniment to the thus-amplified voice and outputting a resulting sound.

12. A remote control adapter for use in a karaoke machine to remotely control sound effects applied to a voice input comprising:

a housing of a configuration to be removably secured to an exterior portion of a microphone;

operating control members positioned on the housing independent from operation of the microphone to enable predetermined audio effects to be generated by the karaoke machine; and a signal emitting means in the housing for emitting a control signal inputted by the operator control members to the karaoke machine to enable the audio effects.

13. The invention of claim 12 wherein the housing has an approximately C-configuration of a size smaller than a handle portion of the microphone and is sufficiently resilient to enable a compressive fit with the microphone handle.

14. The invention of claim 12 wherein the housing has a ring-like configuration of a size relative to a handle of the microphone to provide a friction fit to the microphone handle.

15. The invention of claim 12 wherein the signal emitting means emits an infrared coded signal.

16. The invention of claim 15 further including an infrared receiver unit connected to the machine for receiving the infrared coded signal.

17. The invention of claim 15 wherein the signal emitting means includes a plurality of infrared emitters spaced about the housing to provide an omni-directional emission of infrared coded signals.

18. An improved hand-held microphone for use in a voice transmitted audio reproduction system, said microphone having a body adapted to be hand-held and forming a handle therefor, said improvement comprising:

a remote controller removably mounted on said body of said microphone including:
  means for securing the remote controller to said body;
  user means for selecting audio effects to be applied to an audio output signal;
  signalling means for communicating said selected audio effects from said remote controller to said audio reproduction system; and
a housing enclosing said signalling means and having said user means exposed thereon.

19. A microphone as recited in claim 18 wherein said signalling means transmits an infrared beam to communicate with said audio reproduction system.

20. A microphone as recited in claim 19 wherein said signalling means comprises a plurality of infrared beam emitting diodes positioned within said housing and exposed therefrom on opposed sides.

21. A microphone as recited in claim 19 wherein said infrared beam is encrypted to communicate with a plurality of different audio reproduction systems.

22. A microphone as recited in claim 21 wherein said remote controller further comprises a central processing unit, storage means for storing different audio reproduction system codes, and control means for controlling said signalling means to emit a predetermined frequency infrared beam associated with said audio reproduction system codes when said code is retrieved by said central processing unit.

23. A microphone as recited in claim 21 wherein said user means are mounted on top of said housing, and said signalling means is positioned to transmit an infrared beam out of at least one side of said housing.

24. A microphone as recited in claim 23 wherein said means for securing the remote controller to said body consists of a C-shaped member adapted to fit about said body.

25. A microphone as recited in claim 24 wherein said C-shaped member comprises a rubber layer on an interior of said C-shaped member for frictionally securing said body within said C-shaped member.

26. A microphone as recited in claim 23 wherein said user means consists of a ring-shaped member adapted to fit about said body.

27. A microphone as recited in claim 26 wherein said ring-shaped member comprises a rubber layer on an interior of said ring-shaped member for frictionally securing said body within said ring-shaped member.

* * * * *